United States Patent
Tsonev et al.

(10) Patent No.: US 10,135,528 B2
(45) Date of Patent: Nov. 20, 2018

(54) RECEIVER FOR COMMUNICATIONS SYSTEMS

(71) Applicant: The University Court of the University of Edinburgh, Edinburgh (GB)

(72) Inventors: Dobroslav Tsonev, Edinburgh (GB); Harald Haas, Edinburgh (GB); Zixiong Wang, Edinburgh (GB); Stefan I. Videv, Edinburgh (GB); Tom Higgison, Edinburgh (GB)

(73) Assignee: The University Court of the University of Edinburgh, Edinburgh (GB)

( * ) Notice: Subject to any disclaimer, the term of this patent is extended or adjusted under 35 U.S.C. 154(b) by 195 days.

(21) Appl. No.: 15/101,341

(22) PCT Filed: Dec. 2, 2014

(86) PCT No.: PCT/GB2014/053579
§ 371 (c)(1),
(2) Date: Jun. 2, 2016

(87) PCT Pub. No.: WO2015/082907
PCT Pub. Date: Jun. 11, 2015

(65) Prior Publication Data
US 2016/0308614 A1 Oct. 20, 2016

(30) Foreign Application Priority Data
Dec. 2, 2014 (GB) .................................. 1321262.6

(51) Int. Cl.
*H04B 10/00* (2013.01)
*H04B 10/116* (2013.01)
(Continued)

(52) U.S. Cl.
CPC .......... *H04B 10/116* (2013.01); *H04B 10/69* (2013.01); *H04B 10/807* (2013.01)

(58) Field of Classification Search
CPC ..... H04B 10/116; H04B 10/69; H04B 10/807
See application file for complete search history.

(56) References Cited

U.S. PATENT DOCUMENTS 7,474,855 B2 * 1/2009 Nishimura .............. G06F 3/011
398/118
9,158,133 B1 * 10/2015 Pletcher ................... G02C 7/04
(Continued)

FOREIGN PATENT DOCUMENTS

EP 1990936 A1 11/2008
EP 2120373 A1 11/2009

OTHER PUBLICATIONS

International Searching Authority, International Search Report and Written Opinion for International Application No. PCT/GB2014/053579, dated Jul. 1, 2015, 19 pages, European Patent Office, The Netherlands.

*Primary Examiner* — Tesfaldet Bocure
(74) *Attorney, Agent, or Firm* — Alston & Bird LLP

(57) ABSTRACT

A receiver system (100) having at least one receiver (101) for receiving optical communications signals (103b) that encode or transmit information; wherein the receiver system (100) is adapted to produce one or more electrical signals (104) from the received optical signal (103b) and/or from ambient light (103a) such that the receiver system (100) is usable as a source of electrical power and the encoded or transmitted information from the received optical communication signal (103b) is recovered or recoverable from the electrical signal(s) (104). Embodiments of the invention also relate to a communications system (400) that further comprises one or more transmitters (406) and a device having the receiver systems (401), along with associated methods of
(Continued)

using and producing. Particular embodiments relate to identification tags (1000) and user devices (300) having a display (301) that at least partially overlaps the receiver(s) (302).

50 Claims, 6 Drawing Sheets

(51) Int. Cl.
*H04B 10/80* (2013.01)
*H04B 10/69* (2013.01)

(56) References Cited

U.S. PATENT DOCUMENTS

| | | |
|---|---|---|
| 9,722,699 B2 * | 8/2017 | Sprenger .......... H04B 10/07955 |
| 9,735,892 B1 * | 8/2017 | Pletcher ............... H04B 10/807 |
| 2004/0044709 A1 | 3/2004 | Cabrera et al. |
| 2004/0101312 A1 | 5/2004 | Cabrera |
| 2004/0174287 A1 * | 9/2004 | Deak ..................... G08C 17/02 |
| | | 341/173 |
| 2007/0132592 A1 | 6/2007 | Stewart et al. |
| 2010/0054748 A1 * | 3/2010 | Sato ................... H04B 10/1149 |
| | | 398/130 |
| 2016/0308367 A1 * | 10/2016 | Cummings ............. H02J 1/102 |

\* cited by examiner

RECEIVER FOR COMMUNICATIONS SYSTEMS

CROSS REFERENCE TO RELATED APPLICATIONS

This application is a National Stage Application, filed under 35 U.S.C. 371, of International Application No. PCT/GB2014/053579, filed Dec. 2, 2014, which claims priority to United Kingdom Application No. 1321262.6, filed Dec. 2, 2013; the contents of both of which are hereby incorporated by reference in their entirety.

BACKGROUND

Related Field

The present invention relates to receivers for optical communication and associated communications systems and methods.

Description of Related Art

Optical Wireless Communication (OWC) is being contemplated as a method of transmitting high data rates to mobile devices. The technology has further application in replacing point-to-point infrastructure in places where conventional infrastructure does not exist or is too expensive to build. A key benefit of OWC is that it utilizes a part of the electromagnetic spectrum not traditionally used for wireless telecommunications, and could overcome the limitations introduced by the radio spectrum approaching capacity whilst demand is still growing.

In conventional OWC an active photo-detector (PD) is used, i.e. the optical communications receiver requires a suitable power supply to function. Received light data is first detected as an AC current variation through the PD and then converted into a suitable voltage signal for further processing using a transimpedance amplifier.

Interrogatable transponder tags or identification system tags are used for identification or tracking of objects or locations, including: equipment; products; inventory; or living beings. Some known Radio Frequency Identification (RFID) systems are radio communication systems that communicate between a radio transceiver, called an interrogator, and a number of inexpensive devices called tags. It is an objective of designers of such identification systems to design a system that is low cost in terms of total cost of ownership, and is both reliable and secure.

In the above exemplary RFID systems, the interrogator communicates to the tags using modulated radio signals, and the tags respond with modulated radio signals.

It is an object of at least one embodiment of the present invention to provide an improved or alternative receiver for use in optical wireless communications.

It is an object of at least one embodiment of the present invention to provide an improved or alternative identification tag.

It is an object of at least one embodiment of the present invention to provide an improved or alternative means of integrating an optical wireless communications receiver or receiver array into user devices with displays.

BRIEF SUMMARY

Various aspects of the present invention are defined in the independent claims. Some preferred features are defined in the dependent claims.

According to a first aspect of the present invention is a receiver system.

The receiver system may comprise at least one receiver for receiving optical communications signals. The optical communications signals may be or comprise Optical Wireless Communications (OWC) signals, such as Visible Light Communications (VLC) signals. The optical communications signals may encode or transmit information. The at least one receiver may be configured to produce an electrical signal (e.g. electrical energy) from the received optical signal and/or from ambient light, i.e. the receiver may directly convert the received optical signal and/or ambient light into an electrical signal. The receiver system may be arranged such that at least one electrical component is powered by the electrical signal (e.g. electrical energy) from the at least one receiver. In other words, the at least one receiver may be usable as a source of electrical power.

The receiver system may be configured such that at least some or all of the power may be generated from the received optical wireless communication signal, e.g. by the at least one receiver. In other words, both power and data may be derived or derivable by the receiver system, e.g. by the receiver, from the optical wireless communication signal. This may be particularly beneficial where the light transmitter is a high power and/or coherent transmitter such as a laser, laser diode and/or the like.

The receiver system may be configured to determine the encoded or transmitted information from the received optical wireless communication signal. As such, the at least one receiver may be operable to both generate electrical power and may provide one or more electrical signals from which information encoded or transmitted in the optical signal may be recovered or recoverable.

The receiver system may be configured to receive signals encoded by Orthogonal Frequency Division Multiplexing.

The receiver system may comprise a screen or display, wherein the screen or display and the at least one receiver are arranged such that a portion of the light passing through the screen/display or receiver(s) may be utilised by the other of the screen/display or receiver(s).

The receiver system may comprise at least one receiver array. The at least one receiver may be comprised in the receiver array.

The screen or display may be or comprise a transparent or semi-transparent screen or display.

The screen or display may be substantially transparent or semi-transparent only to one or more parts or portions of the light spectrum. The at least one receiver or receiver array may be receptive to at least one of the one or more parts or portions of the light spectrum.

The at least one receiver or receiver array may be configured to receive optical communications signals that have passed through the screen or display.

The at least one receiver or receiver array may be substantially transparent or semi-transparent to one or more parts or portions of the light spectrum. The screen or display may utilise at least one of the one or more parts or portions of the light spectrum.

The at least one receiver or receiver array may be mounted in front of the screen. The screen may be visible through the at least one receiver or receiver array.

The receiver system may comprise at least one receiver system. The at least one receiver or receiver array may be comprised within the receiver system(s).

The receiver system may be partially or wholly powered by the energy produced by the at least one receiver.

The receiver system may be configured to act as a power supply for an attached load or apparatus.

The receiver system may be, comprise or be comprised in a wireless identification tag.

The receiver system may comprise a transmission system. The transmission system may comprise at least one light transmitter configured to send visible light communications signals.

The tag may comprise a memory capable of storing an identification code to be transmitted by the transmission system.

The tag may be partially or wholly powered from received light.

The tag may comprise one or more signal receiving detectors. The signal receiving detectors may comprise at least one photo diode.

The transmission system may be configured to transmit signals, and/or the receiving system may be configured to receive signals, having a wavelength, or a band of wavelengths, in the range of 350 nm and 2000 nm.

The tag may comprise triggering means and a controller. The controller may be configured to operate the transmission system to transmit the signal when the triggering means receives at least one trigger.

The trigger may comprise a code or signal comprised or encoded in the signal received by the receiving system or a manual or mechanical trigger.

The controller may be configured to use the trigger as an input or data source for the signal to be transmitted and/or the controller may be configured to drive the transmission system to emit a signal encoded with a code derived from the storage means, from the processing means, from the triggering means, or any combination therefrom.

The tag may be configured to operate in a beacon mode in which the tag repeatedly transmits a code or codes while the tag has sufficient power to operate and power the transmission system.

The tag may be configured to emit or transmit the encoded signal whenever there is sufficient light falling on the solar cell or photovoltaic device to power the tag.

The tag may be configured to operate in code trigger mode in which the controller is configured to activate the transmission system when the controller determines that the trigger code is encoded or comprised in a received signal.

The tag may be remotely programmable, such that at least a portion of the data stored in the memory or storage may be changed upon reception of an associated signal or code.

The data changed may comprise transmission codes or other data such that the tag is operable as a data relay. The data may be deliverable to the tag by an external programming device and receivable from the tag by an external interrogating device at a later time.

The tag may be configured to operate in a full transponder mode wherein, once the tag is triggered and/or while powered or enabled, the tag retransmits any data it receives.

The receiver system may comprise or be comprised in a communications system comprising at least one tag and at least one receiving or interrogating device for receiving signals transmitted by the tag and/or at least one transmitter device or remote programming device for transmitting signals to the tag.

The receiver system or tag may comprise, or be comprised in, or configured to communicate with a sensor system, the sensor system comprising a sensor. The receiver system or tag may be configured to receive sensor data from the sensor.

The receiver system or tag may be configured to process the sensor data. The tag may be configured to transmit sensor data, e.g. from the sensor.

Advantageously and preferably, the at least one receiver may be or comprise a solar cell or photovoltaic device.

In this way, light energy received by the at least one receiver may not be discarded but may be used to power, or partially power, the receiver system. For example, the at least one receiver may be wholly or partially self-powered. However, in some embodiments, at least some other components of the receiver system may require their own power supply, and/or the electrical energy generated by the receiver may be used to power at least some of the other components of the receiver system.

The signal may comprise a DC or slowly varying component which primarily carries power and an AC component which primarily carries the transmitted or encoded information. The receiver system may be configured to use the DC or slowly varying component for power and the AC component to determine the transmitted information carried by the signals.

Advantageously and preferably, the at least one receiver may comprise a passive receiver. The receiver may be completely powered by the light falling on it. In other words, the receiver may not require an additional power supply in order to generate an electrical signal from a received optical signal.

The at least one receiver may directly produce a voltage, e.g. from the received signal. The receiver system may be such that no transimpedance amplifier is required to convert the received signals. The at least one receiver may be adapted to simultaneously provide power and communications, e.g. receive the signals or determine the information encoded or transmitted by the signals concurrently with producing electrical energy.

The at least one receiver may be or comprise a substantially transparent or semi-transparent solar cell. The substantially transparent or semi-transparent solar cell may be transparent or semi-transparent only for one or more parts or portions of the light spectrum. For example, the substantially transparent or semi-transparent solar cell may be transparent to visible light, but absorb light in the infra-red region of the spectrum. The at least one solar cell may be or comprise a flexible solar cell. As such, for example, the receiver system may be incorporated into locations such as windows, e.g. of buildings or vehicles, or into clothes, upholstery or furniture.

The at least one receiver may be attached to a building or vehicle, for example as a transparent solar cell in or on a window or as a traditional solar cell elsewhere.

In examples, the receiver system may be operable to receive point to point communications, for example internet connectivity from a base station to a mobile device or a data connection from a traffic light to a vehicle, and/or may be operable to receive broadcast notifications relevant to a neighbourhood.

The receiver system may be configured to receive signals encoded by Orthogonal Division Frequency Multiplexing (OFDM) or by On-Off Keying (OOK). However, a skilled person would appreciate that other suitable encoding schemes could be used.

The receiver system may comprise at least one filter, e.g. an electronic filter, for example a low pass or band pass filter. The receiver system may comprise at least one amplifier, such as an amplifier with a set or adjustable gain. The at least one filter may be operable to derive the AC signal that encodes the information and/or the DC power from the electrical signal generated by the solar cell or photovoltaic device.

The receiver may be connected to a load or apparatus, for example to at least partially power the load or apparatus. The load or apparatus may comprise, for example, a charger for a battery or capacitor or another electrical storage device, a power controller, processing apparatus, and/or the like.

The receiver system may comprise processing apparatus for processing the received signals, such as a microcontroller, ASIC, FPGA or other electronic circuitry. The receiver system may be configured such that the processing apparatus is completely or partially powered by the energy produced by the at least one receiver.

The receiver system may be configured to act as a power supply for an attached device. In this way the receiver system may completely or partially power an attached device, and may provide power to sensors, processing apparatus, battery chargers and/or other electronic or electrical components.

As such, OWC may be a key enabler for the internet of things, which could see a growing number of everyday objects enabled with sensors and communication systems. The above technique may provide a low energy, effective solution for this communication, and may sidestep some of the issues introduced by poor or crowded RF signals such as wi-fi signals.

The receiver system may be configured such that the signals or OWC beams are only received on one or more parts or portions of an active surface of the at least one receiver. The parts or portions may be less than the total active surface area of the receiver. The active surface may be a surface of the receiver for which light received on the active surface is convertible or transducable into electrical energy by the receiver.

The receiver system may comprise focusing or other optical steering means for focusing or beam directing the one or more optical communications signals or OWC beams onto the at least one receiver or onto the parts or portions of the at least one receiver.

In this way, the effective capacitance of the solar cell may be reduced. This in turn may allow the responsiveness and/or bandwidth of the receiver to be improved.

The focusing or other optical steering means may comprise a fixed system or may comprise a system which adjusts the focusing or beam directing as appropriate to maintain a balance of data bandwidth and energy production. It is to be understood that this may be a dynamic process which may change in real-time based on the usage of the receiver system.

The focusing means may comprise one or more optical components such as lenses, refractive components and/or reflective components. The focusing means may comprise adjustment apparatus for adjusting the focus. The adjustment apparatus may be manual or may be powered and controlled by the receiver system or an attached device.

The receiver system may comprise at least one receiver array and the receivers may be comprised in the receiver array(s). The at least one receiver array may be configured to act as a receiver for Multiple Input Multiple Output (MIMO) communications. The at least one receiver array may be configured to receive signals modulated by spatial modulation.

The at least one receiver or receiver array may be arranged in series with a screen or display of a user device, such as a smartphone or laptop. For example, the screen or display and the at least one receiver or receiver array may at least partially, and preferably wholly, overlap in a plan view or viewing direction of the screen or display. For example, the at least one receiver or receiver array may be adapted to be mounted in front of or behind a screen or display of the user device. As such, at least a portion of the light or spectrum passing through one of the display or receiver(s) may be utilised by the other of the display or receiver(s). The screen or display of the user device may therefore become a receiver for optical communications as well as optionally also being a source of power for the user device. This may neatly provide a receiver system having a large area for optical communications without significantly increasing the proportions of the user device.

The screen or display may be or comprise a transparent or semi-transparent screen or display, such as an OLED screen or display. The screen or display may be substantially transparent or semi-transparent only to one or more parts or portions of the light spectrum. The optical communications receiver may be configured to receive optical communications signals that have passed through the screen or display. For example, the screen or display may be transparent to infrared light, and a receiver mounted behind it receptive to this light. Alternatively, a receiver which is transparent to visible light may be mounted in front of the screen or display, and harvest energy from the non-visible light incident on it.

The receiver(s) or receiver array may be configured to receive and/or utilise the parts and/or portions of the light spectrum to which the screen or display is transparent or semi-transparent. The screen or display may be substantially transparent or semi-transparent to parts of the light spectrum for which the receiver or receiver array is opaque. The receiver or receiver array may be substantially transparent or semi-transparent to parts of the light spectrum for which the screen or display is opaque, or which the screen or display utilises for operation.

According to a second aspect of the present invention is a communications module comprising the receiver system of the first aspect of the present invention.

The communications module may additionally comprise at least one transmission system.

The at least one transmission system may comprise at least one transmitter. The at least one transmitter may be or comprise an optical communications transmitter, such as a VLC transmitter. For example, the at least one transmitter may be an LED, a laser diode, a laser, a LEP surface, a quantum dot emitter, and/or the like.

Optionally, the at least one optical communications transmitter may be configured to utilise a different part of the electromagnetic spectrum to that of the receiver, for example, in order to aid differentiation of incoming and outgoing signals. The transmission system may be configured to use OFDM, OOK or the like. The at least one optical communications transmitter may be comprised in a transmitter array, e.g. so that the transmission system is able to send MIMO signals. The transmission system may be configured to send signals that are encoded using spatial modulation.

The at least one transmission system may utilise a separate modality of communications, e.g. so that the communications module may convert received optical communications signals into another form of communication signal. The at least one transmission system may be wireless or wired. For example, the transmission system may be or comprise a wi-fi module, Bluetooth module, Near-Field Communication (NFC) module, Radio Frequency (RF) communications module, Power Line Communication (PLC) module, Ethernet module, USB port, serial port, I²C module, CANBUS module, acoustic transmitter, and/or the like.

The communications module may be wholly or partially powered by the energy produced by the at least one solar cell or photovoltaic device. The communications module may be configured to act as a power supply for an attached device, since it produces power from the at least one solar cell or photovoltaic device. In this way the communications module may completely or partially power an attached device, and may provide power to, for example, sensors, processing apparatus, battery chargers and/or other electronic or electrical components.

The communications module may comprise communications processing apparatus such as a microcontroller, ASIC, FPGA, or other electronic circuitry. The communications processing apparatus may be wholly or partially powered by the energy produced by the at least one solar cell or photovoltaic device. The communications processing apparatus may be shared between the receiver system and the transmission system.

The communications module may be configured to receive point-to-point communications and/or broadcast communications. The communications module may be configured to transmit point-to-point communications and/or broadcast communications.

The communications module may be comprised in a vehicle or building or in a device or a wireless identification tag.

The communications module may be configured such that at least some or all of the power may be generated from the received optical wireless communication signal, e.g. by the at least one receiver. In other words, both power and data may be derived or derivable by the communications module, e.g. by the receiver, from the optical wireless communication signal.

The communications module may comprise, or be comprised in, or configured to communicate with a sensor system, the sensor system comprising a sensor. The communications module may be configured to receive sensor data from the sensor. The communications module may be configured to process the sensor data. The communications module may be configured to transmit sensor data, e.g. from the sensor.

According to a third aspect of the present invention is a device comprising the receiver system of the first aspect of the present invention and/or the communications module of the second aspect of the present invention.

Various devices or applications for which the receiver system of the first aspect and/or the communications module of the second aspect could be used would be apparent to a skilled person from the teaching of the present application.

For example, the device may be or comprise a user device, such as a smartphone, laptop, tablet computer, television and/or the like.

In examples, the receiver system may be embedded behind or in front of a screen or display of the user device. For example, an array of solar cells configured as receivers for MIMO communication may be provided behind or in front of the screen or display of the user device. This arrangement may give the device the ability to receive MIMO and/or spatially modulated optical signals. The screen or display may be or comprise a transparent or semi-transparent screen or display, such as an OLED screen or display. The optical communications receiver may be configured to receive optical communications signals that have passed through the screen or display. The screen of the user device may therefore become a receiver for optical communications as well as optionally also being a source of power for the user device.

The receiver(s) or receiver array may be configured to receive and/or utilise the parts and/or portions of the light spectrum to which the screen or display is transparent or semi-transparent. The screen or display may be substantially transparent or semi-transparent to parts of the light spectrum for which the receiver or receiver array is opaque. The receiver or receiver array may be substantially transparent or semi-transparent to parts of the light spectrum for which the screen or display is opaque, or which the screen or display utilises for operation.

In examples, the device may be or comprise a sensor apparatus. For example, the device may comprise a sensor, such as an environmental sensor, which may be suitable for embedding into an item of clothing or furniture. The sensor apparatus may receive instructions, control data and/or data pertaining to its operation via the receiver system and/or transmit data collected by the sensor using the transmission system. For example, the instructions or control data may comprise a sampling frequency, instructions to activate or deactivate a transmission system of the communications module, the current time, and/or the like.

In examples, the device may be or comprise an actuator, transducer or relay. For example, the device may be or comprise a switched socket, to enable home or workplace automation or a set of blinds which are instructed to move or a speaker which is sent audio data or instructions for volume or the like.

The device may be or comprise an appliance such as a dishwasher, oven, vacuum cleaner or the like.

The device may be comprised in an item of clothing or furniture. The device may be or be comprised in a wearable device, such as a pair of glasses.

The device may be or comprise a wireless identification tag, such as that described below in relation to the seventh or eighth aspects.

The device may be wholly or partially powered by the energy produced by the at least one receiver that comprises a solar cell or photovoltaic device. The device may be configured to act as a power supply, since it produces power from the at least one solar cell or photovoltaic device comprised within. In this way the device may provide power to attached hardware, or may comprise an outlet, socket or other connection from which electrical power may be drawn.

According to a fourth aspect of the present invention is a vehicle or building which comprises a receiver system of the first aspect of the present invention, a communications module of the second aspect of the present invention, and/or a device of the third aspect of the present invention.

The vehicle or building may be configured to receive point-to-point communications using the receiver system, such as internet connectivity or a direct data link. Various examples of such use may be envisaged.

For example, a remote building or vehicle may be configured to receive internet connectivity through a directional optical link. The vehicle or building may be configured to receive broadcast communications which may be relevant to a particular neighbourhood or locality. For example, a vehicle being stopped suddenly may emit an encoded optical signal which is then received by nearby vehicles in order that appropriate action may be taken. In another example, environmental warnings such as storm alerts may be issued by street lighting and received by nearby buildings. Such warnings may include highly specific information to enable residents to take action most appropriate to their location.

According to a fifth aspect of the present invention is a communications system comprising a receiver system of the first aspect of the present invention, a communications module of the second aspect of the present invention, a device of the third aspect of the present invention, and/or a vehicle or building of the fourth aspect of the present invention.

The communications system may include one or more receiver systems according to the first aspect and one or more transmitters. The receiver systems may be arranged to receive signals from the transmitters. The communications system may comprise at least one, and preferably a plurality of communications modules according to the second aspect. The receiver systems and/or transmitters may be comprised in the communications modules.

The communications system may be configured to utilise point-to-point communications. Various examples of applications for the communications system may be envisaged from the teachings of the present application.

For example, a receiver system on a speaker may receive audio data from a communications module or device connected to or comprised in a computer or digital audio player or storage device; or a laptop comprising a communications module may receive internet connectivity from a router or relay comprising another communications module; or a building may receive internet connectivity from a base station without the need to lay cable or fibre between a base station and individual buildings (e.g. the so called difficult last mile); or a vehicle may be parked outside a house, and then data downloaded from the trip computer to the house's network through communication modules and/or receiver systems as appropriate.

The communications system may be configured to utilise broadcast communications. For example: a receiver system on a building may be sent locally relevant information (e.g. storm warnings, roadworks, the proximity of refuse collectors, neighbourhood bulletins etc.) from a broadcast source on the street (e.g. a street light); a vehicle being subjected to heavy braking may broadcast this fact through a communications module attached to its tail lights, to be received by receiver systems on any vehicles behind it.

However, it will be appreciated that these may only be some of the potential applications, and other suitable applications may be apparent to a skilled person from the teachings of the present application.

According to a sixth aspect of the present invention is a method of receiving an optical communications signal using the receiver system of the first aspect of the present invention. The method may comprise receiving the optical signal and converting the optical signal into an electric signal that has a DC component and an AC component, and using the DC component to provide electrical power, e.g. to some or all of the circuitry involved in receiving the signal.

The method may comprise utilising one or more solar cells or photovoltaic devices as receivers for the optical communications signal. The method may comprise receiving an Optical Wireless Communications signal such as a Visible Light Communications signal using the receivers. The method may comprise determining transmitted information from the received optical wireless communication signal. The method may comprise generating electrical power from the one or more receivers.

The method may comprise utilising one or more receiver systems of the first aspect of the present invention, one or more communications modules of the second aspect of the present invention, one or more devices of the third aspect of the present invention, one or more vehicles or buildings according to the fourth aspect of the present invention, and/or one or more communications system s according to the fifth aspect of the present invention.

The method may comprise receiving a signal using one or more receiver systems of the first aspect behind a transparent or semi-transparent screen or display.

According to a seventh aspect of the present invention is a tag such as an identification tag. The tag may be configured to receive and/or transmit data using optical wireless communication, preferably visible light communication. In other words, the tag may be configured to receive and/or transmit data encoded using light, preferably visible light.

The tag may be at least partially and preferably wholly powered from light, e.g. the tag may be or comprise a Light Powered Identification Tag (LPIT). The tag may be powered from received light signals (e.g. optical wireless communications signals, such as visible light communications signals) and/or ambient light.

The tag may comprise or be comprised in a device according to the third aspect.

The tag may comprise a transmission system for sending or transmitting a signal. The transmission system may include at least one light transmitter, and may be configured to send OWC signals, such as VLC signals. The at least one light transmitter may be or comprise an LED, a laser diode, a LEP surface, a quantum dot emitter, or the like.

The tag may comprise a receiving system, such as a light receiving system, preferably a visible light receiving system. The light receiving system may comprise at least one main light receptor. The at least one main light receptor may comprise a solar cell or photovoltaic device. Energy received by the at least one main light receptor may be used to power, or partially power, the tag. The energy received by the at least one main light receptor may comprise ambient light, an incoming signal, or a combination thereof. The main light receptor may be configured to convert received light energy into electrical energy.

The light receiving system may comprise at least one signal receiving detector. The signal receiving detector may be configured to receive a signal, such as an OWC signal, e.g. a VLC signal. The light receiving system may be configured to convert received optical signals into electrical signals. The light receiving system may be configured to decode or recover information, data or a code from the electrical signal.

The light receiving system may comprise or be comprised in a receiver system according to the first aspect. The at least one main light receptor may also be operable as at least one of the signal receiving detectors. In other words, the main light receptor(s) may both receive and convert optical communications signals into electrical signals and provide electrical power for the tag.

Alternatively or additionally, at least one of the one or more signal receiving detectors may be or comprise a photo diode or the like. The tag may comprise signal receiving detectors in the form of both solar cells and photo diodes. The tag may comprise an array of signal receiving detectors, such that the tag may be capable of receiving MIMO signals. The tag may be configured to receive signals encoded through spatial modulation.

The signal receiving detectors may be configured to receive signals encoded by OFDM, OOK or the like. The signal receiving detectors may be wholly or partially powered by the energy received by the light receiving system.

The transmission system may be configured to transmit signals, and/or the receiving system may be configured to receive signals, having a wavelength, or a band of wavelengths, in the range of 350 nm and 2000 nm, and preferably between 450 nm and 1000 nm.

The light receiving system and the transmission system of the tag may be within the same overlapping field of view, or may be angled such that they are in separate non-overlapping fields of view.

The tag may be or comprise a hybrid tag. For example, the receiving system or the transmission system may be or comprise another modality, such as an IR or RF signal, wired communication, Bluetooth signal, NFC signal, acoustic communication and/or the like.

The tag may comprise a controller, which may be coupled to the transmission system. The transmission system may be operable responsive to the controller to produce or transmit the signal. The controller may pass one or more codes or data to the transmission system. The transmission system may be operable responsive to the controller to encode or transmit the one or more codes or data in the transmitted signal. The controller may comprise processing means for generating, modifying or otherwise processing the signal to be transmitted.

The controller may comprise and/or be configured to access a storage or memory. The storage or memory may store the code, data or information for encoding or carrying by the transmitted signal. The storage or memory may be configured to store a code or data comprised in the received signal.

The tag may comprise triggering means. The receiving system may be operable as the triggering means. The controller may be operable responsive to the triggering means. The controller may be configured to operate the transmission system to transmit the signal when the triggering means receives at least one trigger. The trigger may be or comprise a code or signal, e.g. comprised or encoded in the signal received by the receiving system. The trigger may comprise a manual or mechanical trigger such as a button press.

The controller may be configured to use the trigger as an input or data source for the signal to be transmitted.

The controller may drive the transmission system to emit a signal encoded with a code derived from the storage means, from the processing means, from the triggering means, or any combination therefrom.

The controller may be partially or wholly powered by the light receiving system. The tag may comprise a component capable of storing electrical energy, such as a battery or capacitor. The component capable of storing electrical energy may be at least partially powered or charged by the at least one main light receptor.

As detailed above, the tag may therefore be configured to receive a trigger and transmit a determined light signal in response. It may therefore be used somewhat in the manner of an RFID tag, but exploits the light domain, e.g. for at least the transmit signal. Preferably the tag may also utilise the light domain for the received signal and/or triggering signal, and may also be powered by the light incident upon it. This may bring great advantages: in security; use in environments where RF is not available or otherwise is not acceptable; where a completely non-metallic tag is required; where very fast interrogation of the tag is required; where the volume of data to be transmitted exceeds the capacity of RF tags; where the complete device can advantageously be fabricated on substrates not amenable to RF solutions; where antenna components are unacceptable; or where a single surface fabrication rather than a multi-layer construction is required in the tag.

The tag may be configured to operate in beacon mode. In this mode the tag may repeatedly transmit a code or codes while the tag has sufficient power to operate and power the transmission system.

For example, in embodiments where the tag comprises a solar cell as a main light receptor, the tag may emit the encoded signal whenever there is sufficient light falling on the solar cell to power the tag.

Alternatively the tag may have an additional signal receiving detector. This additional signal receiving detector may be an additional main light receptor or may be a photo diode or the like. In this configuration the triggering means comprises the additional signal receiving detector. When the tag has sufficient power to transmit, and the additional signal receiving detector is activated (e.g. sufficient light is falling on it), the tag will (optionally repeatedly) transmit the signal. It should be noted that the triggering means may alternatively be activated by occlusion of a light sensor, i.e. a drop in the output from the at least one signal receiving detector.

The tag may be configured to operate in code trigger mode. In this mode, the triggering means comprises at least one signal receiving detector, and the controller may be configured to activate the transmission system to transmit the signal responsive to the triggering means, e.g. when the controller determines that the trigger code is encoded or comprised in a received signal. Optionally the tag may respond to a number of different trigger codes, potentially with a different response to each. This may permit the tag to be used with an interrogator that can generate multiple codes or in order to recognise different interrogator devices. The different response may comprise transmission of a different code or signal. These responses may be stored in the storage means, e.g. as a look-up-table (LUT), or calculated by the controller as a function of data stored within it and/or the received signal.

The tag may be remotely programmable, such that at least a portion of the data stored in the memory or storage may be changed upon reception of an associated signal or code. The data changed may comprise transmission codes or other data. For example, the different responses may be programmable, such that they can be dynamically reprogrammed by the controller responsive to associated received trigger codes. In this way, the tag may be operable as a data relay, wherein data may be delivered to the tag by an external programming device, and received from the tag by an external interrogating device at a later time, wherein the interrogating device may be the same or different to the programming device.

The tag may be configured to operate in a full transponder mode. In this mode the triggering means may be activated or triggered as in beacon mode or code trigger mode, but once triggered and/or while powered or enabled, the tag retransmits any data it receives (e.g. from the external programming device). The data may be retransmitted passively. The retransmitted data may or may not comprise the initial triggering code.

The controller may be or comprise an electronic circuit, and may be or comprise a microcontroller, ASIC, FPGA, SoC, memory chip or other digital or analogue circuitry. The controller may be constructed using traditional metal-based circuitry, or may utilise organic or polymer electronics.

The tag may be fabricated onto a substrate. The method of fabrication may comprise inkjetting or other methods normally employed for fabrication of plastic electronics. The tag may be laid down in a single layer on the surface of a substrate, or may be built in multiple layers. The substrate may be or comprise a flexible substrate. The substrate may be or comprise a polymer substrate. The substrate may be or comprise a fabric substrate. The substrate may be or comprise paper.

The controller and/or memory may be formed by or comprise a pattern that modifies a property of the tag substrate or applied layer, for example physical indentations or raised elements in the substrate or variations in resistivity or refractive index.

According to an eighth aspect of the present invention is a communications system comprising at least one tag of the seventh aspect of the present invention.

The communications system may be or comprise or be comprised in a communications system according to the fifth aspect.

The communications system may comprise at least one receiving device for receiving signals transmitted by the tag. The receiving device may be or comprise an interrogating device. The receiving device may be or comprise another tag, such as a tag according to the seventh aspect. The receiving device may comprise a receiver system according to the first aspect.

The communications system may comprise at least one transmitter device for transmitting signals to the tag. The at least one transmitter device may be or comprise a remote programming device. The at least one transmitter device may be or comprise another tag, such as a tag according to the seventh aspect.

The at least one interrogator or the at least one remote programmer may be or comprise a LiFi, Light fidelity and/or VLC transceiver.

According to a ninth aspect of the present invention is a method comprising receiving or transmitting an optical communications signal using a tag according to the seventh aspect or the communications system of the eighth aspect.

The method may comprise interrogating, triggering and/or reprogramming the tag by transmitting one or more optical communications signals to the tag and/or receiving one or more optical communications signals from the tag. One or more of the optical communications signals may comprise a visible light communications signal. The signal may comprise or encode data and/or one or more codes or triggers.

According to a tenth aspect of the present invention is a method of fabricating a tag according to the seventh aspect, the method comprising providing metallic circuit traces and/or organic electronics and/or surface mounted electronic components on a substrate. The substrate may be or comprise a flexible substrate. The substrate may be or comprise a polymeric, fabric or paper substrate. The method may comprise forming one or more components of the tag such as the memory or controller by forming a pattern on the substrate, or on a layer applied to the substrate. The pattern may comprise physical indentations, raised elements or variations in the resistivity or refractive index.

According to an eleventh aspect of the present invention is a computer program product configured to implement the receiver system according to the first aspect, the communications module or system according to the second or eighth aspects, the device of the third aspect, the communications system of the fifth aspect, the tag of the seventh aspect and/or the method of any of the sixth, ninth or tenth aspects.

According to a twelfth aspect of the present invention is a processing apparatus when programmed with the computer program product of the eleventh aspect.

According to a thirteenth aspect of the present invention is a carrier medium comprising, storing or encoding the computer program product of the eleventh aspect.

It will be appreciated that features analogous to those described above in relation to any of the above aspects may be individually and separably or in combination applicable to any of the other aspects.

Apparatus features analogous to, or configured to implement, those described above in relation to a method and method features analogous to the use and fabrication of those described above in relation to an apparatus are also intended to fall within the scope of the present invention.

DETAILED DESCRIPTION OF VARIOUS EMBODIMENTS

Figure 1:
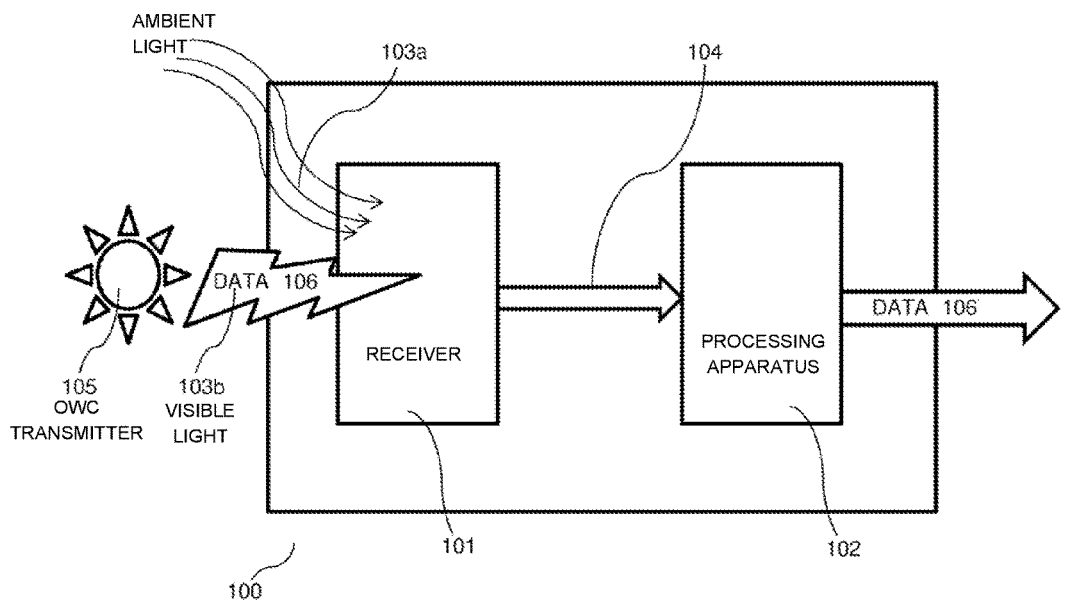
FIG. 1 is a schematic of a receiver system.

FIG. 1 shows an OWC receiver system 100 that comprises a receiver 101 coupled to a processing apparatus 102. Although only one receiver is shown, it will be appreciated that, in embodiments, a receiver array comprising a plurality of receivers 101 can be provided. Advantageously, the receiver 101 is a solar cell that directly generates an electrical signal 104 from light 103*a*, 103*b* incident upon it. The incident light comprises both ambient light 103*a* and a visible light communications signal 103*b* from a suitable OWC transmitter 105. The transmitter 105 encodes information 106 in the light signal 103*b* by suitably modulating the visible light signal, using techniques such as OFDM and on-off keying, as is known in the art. The electrical signal 104 generated by the solar cell upon illumination by the incident light 103*a*, 103*b* is dependent on the received optical communications signal 103*b*.

The processing apparatus 102 receives the transduced electrical signal 104 from the receiver 101, and conditions, decodes and/or processes the signal 104 as necessary in order to recover the transmitted information 106, again using techniques that would be straightforwardly apparent to those skilled in the art.

With the above arrangement, the electrical signal 104 produced by the solar cell 101 comprises both an AC component that can be processed by the processing apparatus 102 to recover the information 106 encoded in the visible light communications signal 103*b* and also a DC component that can be used to power or partially power the processing apparatus 102. In this way the energy of the light 103*a*, 103*b* incident upon the receiver 101 is usable to power or partially power the receiver 101. Since the solar cell produces a voltage, no transimpedance amplifier is required.

Figure 2:
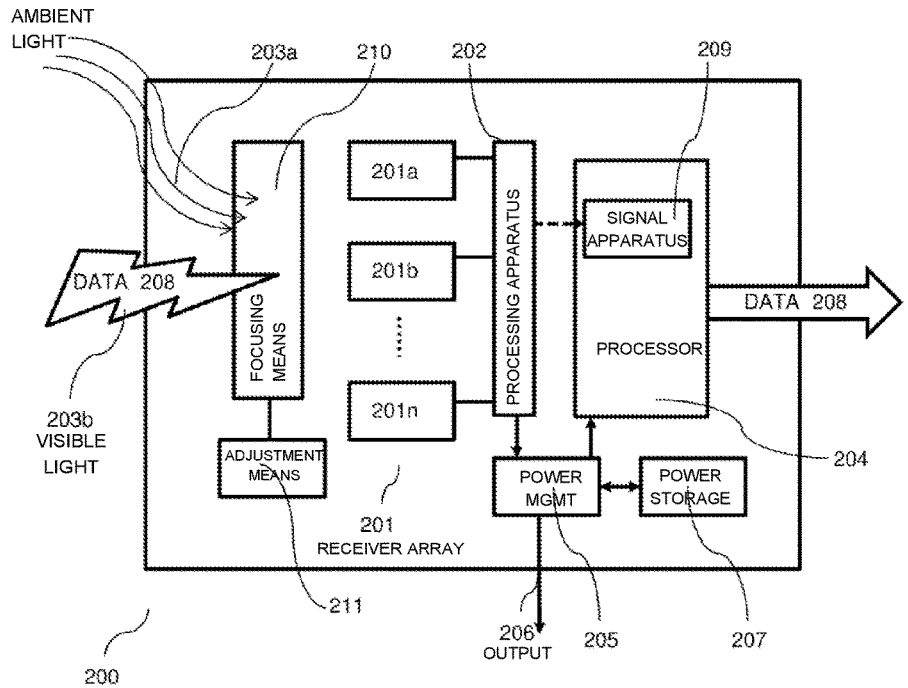
FIG. 2 is a schematic of an alternative receiver system.

FIG. 2 shows another embodiment of an OWC receiver system 200. The receiver system 200 comprises a receiver array 201 having n receivers 201a-201n. The receiver array is connected to a processing apparatus 202. The receivers 201a-201n advantageously comprise solar cells, as in the embodiment of FIG. 1. The receiver array 201 receives light 203a, 203b that comprises a combination of ambient light 203a and a VLC signal 203b. The receiver array 201 is configured to receive MIMO signals and/or signals which have been encoded through spatial modulation, which are optionally further encoded using other techniques such as Orthogonal Frequency Division Multiplexing (OFDM), On-Off Keying (OOK) or the like.

The AC components of the signals generated by the solar cells 201a-201n can be filtered out using an appropriate filter 202 and passed to processing apparatus 204 in order to recover information 208 encoded in the received VLC signal 203b.

At the same time, the DC components of the signals generated by the solar cells 201a-201n can also be filtered out by the filter 202 and provided to a power management system 205, which is responsible for ensuring that the individual components are adequately powered. In this way, the power management system 205 uses the DC component of the electric signal to power the other components of the receiver system 200.

Additionally, the power management system 205 can optionally provide the power received from the solar cell as an output 206 to external devices. Beneficially, the power management system comprises power storage means 207, such as a capacitor, supercapacitor, electrochemical cell or battery or the like. Using the power storage means 207, the power management system can store power generated by the solar cells 201a-201n in order to smooth disturbances in supply, or supply power to the receiver system 200 components when insufficient light is falling on the solar cells 201a-201n.

The processing apparatus 202 communicates the data 208 to a connected device. It will be appreciated that at least part of the processing apparatus 204 could be comprised within a multifunctional circuit or microcontroller, such that the data communication shown can be, for example, within a microcontroller, FPGA or the like.

Advantageously, the processing apparatus 202 comprises signal conditioning apparatus 209 including one or more filters and/or amplifiers, such as low pass or band pass filters, set or adjustable gain amplifiers, or the like. The signal conditioning apparatus 209 could be implemented in the form of analog circuitry, digital circuitry and/or be comprised within a microcontroller, FPGA or the like, or some combination thereof.

Optionally, the receiver system 200 comprises focusing means 210, which receives all or a portion of the light 203a, 203b before it passes to the receiver array 201. The focusing means 210 is configured to focus the light 203a, 203b onto parts or portions of the active surface area of the receivers 201a-201n, wherein each part or portion is less than the total surface area of the associated receiver 201a-201n. The focusing means 210 is operable to thereby increase or decrease the light intensity on a particular part of a receiver 201a-201n, with a corresponding change to the area upon which the light is incident. In this manner, the focusing means 210 can change the effective capacitance provided by the solar cell which is used as receiver 201a-201n, in order to improve the responsiveness of the receivers 201a-201n.

The focusing means 210 comprises one or more optical components such as lenses (not shown), which serve to focus all or part of the incident light 203a, 203b. In optional embodiments, the focusing means comprise adjustment means 211, which is configured to adjust the effect of the focusing means 210, for example to increase or decrease the focus of light falling on a particular receiver 201n or part or portion of a receiver 201a-201n. The adjustment means 211 could be controlled by the receiver system 200, for example through the processor 204, or may be controlled by an external input, such as a manual or automated adjuster.

Figure 3:
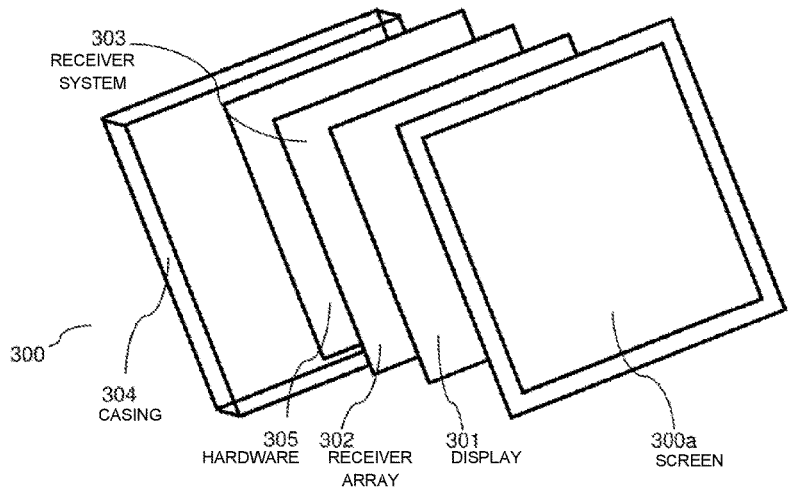
FIG. 3 is an exploded view of a user device comprising a receiver system, such as that of FIG. 1 or 2.

FIG. 3 illustrates an example of a receiver system 303 being utilised behind a screen 300a and display 301 of a user device 300. The user device 300 is shown as a tablet-like device, but it should be understood that this system is equally applicable to smartphones, laptops, desktop monitors, televisions or any device with a screen and display. The display 301 is advantageously substantially transparent or semi-transparent, such that light can pass through the display to the receiver system 303 behind. An OLED display is an example of a display 301 that can be made suitably transparent.

The receiver system 303 comprises an array of receivers 302. However, the system is operable with any number of receivers, such as one or more receivers. The remainder of the receiver system 303 is connected to the receiver array 302, and the whole receiver system 303 may be contained within the casing 304 of the device. The hardware 305 required to operate the display can be located as best suits the design of the user device, such as behind the receiver system 303, i.e. on an opposite side of the receiver system 303 to the display 301.

In an optional embodiment, the receiver array 302 is substantially transparent or semi-transparent, and the user device is configured to let light fall on the receiver array 302 from either side. It should be noted that if the receiver array 302 is substantially transparent to the frequencies of light utilised by the display 301 then, in some embodiments, the receiver array 302 can be positioned in front of the display 301.

Optionally, the receiver array 302 is configured to receive MIMO signals and/or signals which have been encoded through spatial modulation and/or signals which have been encoded through OFDM, OOK or the like.

Advantageously, the receivers or the receiver array 302 comprise a one solar cell or photovoltaic device that produces electrical power from light incident upon it. As in the embodiments of FIGS. 1 and 3, this light can be a combination of ambient light and an encoded optical communications signal. The electrical power produced by the receiver array 302 can therefore be used to at least partially power the receiver array 302, the receiver system 303, the user device 300, or any part of combination thereof. As in the embodiments of FIGS. 1 and 2, the receiver system 303 comprises a power management system (not shown) which is configured to route power to, from and around the user device 300.

The user device 300 of FIG. 3 provides an advantageous way to mount a communications link in a user device, using optical wireless communications receiver systems, such as those of FIGS. 1 and 2. The large display area of many modern user devices means that the receiver array 302 can also have a large surface area, and is thus capable of receiving a large amount of light. Advantageously, the OWC receiver system can provide a high bandwidth data receiver, without substantially increasing the size of the user device. Since the receiver system utilises optical communications, it need not interfere with any other communications devices on the user device which utilise different parts of the electromagnetic spectrum. For example, if the user device is a phone with telecommunications, Bluetooth, Wi-Fi, Near Field Communications, or any one or combination of the preceding, the OWC receiver system can allow a great deal of additional information to be received by the user device, without associated interference.

Figure 4:
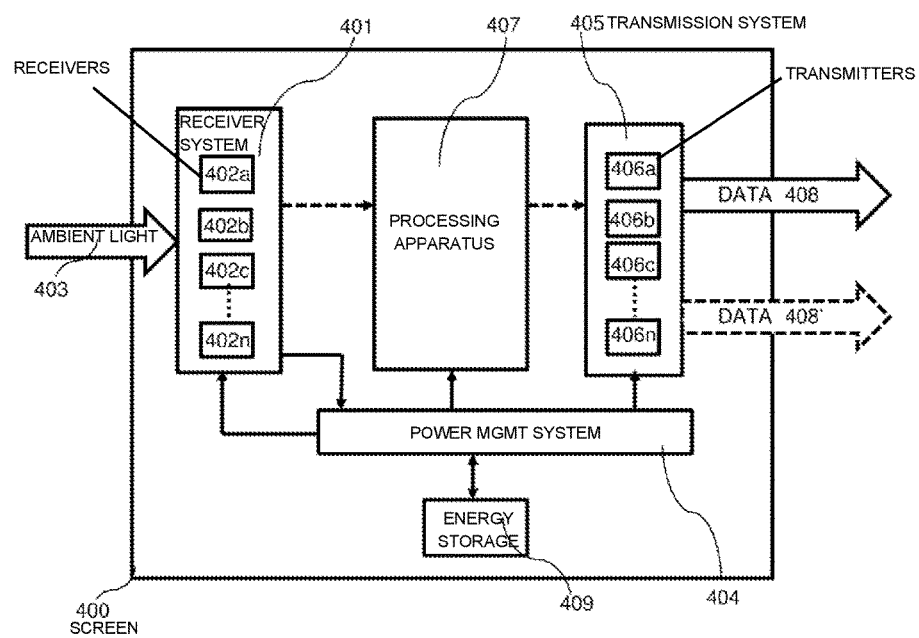
FIG. 4 is a schematic of a communications module comprising a receiver system.

FIG. 4 shows a communications module 400 that comprises a receiver system 401, such as a receiver system substantially similar to those described above in relation to FIG. 1, 2 or 3. As described above, the receiver system 401 contains one or more OWC receivers, and is capable of simultaneously receiving and transducing both OWC signals and ambient light 403. As in the embodiments of FIGS. 1 to 3, the receivers 402 comprised within the receiver system 401 are advantageously solar cells or photovoltaic devices, which can directly generate an electrical signal from the received optical signals and ambient light. The generated electrical signal can be processed to provide both electrical power and to recover the information encoded by the received optical communications signal, as detailed above in relation to FIGS. 1 to 3.

In this case, the receiver system 401 provides a power input to a power management system 404, allowing the energy received by the at least one solar cell to power all or part of the communications module 400.

The communications module 400 further comprises a transmission system 405, which in turn comprises a transmitter array having n transmitters 406a-406n. The transmitters 406a-406n are advantageously OWC transmitters, to allow the communications module to emit encoded visible light OWC signals. The transmitter array 406a-406n is configured to emit MIMO OWC signals, which may be encoded using spatial modulation, OFDM, OOK and/or the like.

The receiver system 401 and transmission system 405 are connected through communications processing apparatus 407, which receives signals from the receiver system 401 and communicates with the transmission system 405, such that the communications processing apparatus 407 can transmit data and instructions 408 using the transmission system 405. Optionally, the communications processing apparatus 402 is at least partially comprised within a multifunctional circuit or microcontroller, such that the data 408 can be communicated within, for example, a microcontroller.

The power management system 404 ensures the various components are adequately powered, as described above in relation to the embodiment of FIG. 2, via the use of energy storage 409, such as a battery or capacitor.

In optional embodiments that relate to a hybrid communications module, the transmission system 405 comprises a different modality of communication means to OWC, for example Ethernet or CANBUS. The transmission system according to this embodiment therefore connects to a bidirectional bus, and the communications module is capable of receiving data from OWC signals and communicating data 408' to other devices through this bus via electrical signals.

In this example, the embodiment of the communications module can be used to connect an OWC receiver to an existing network, such as an Ethernet network in a house, or a CANBUS network in a vehicle. It is to be understood that a great number of potential communications methods are available, including Wi-Fi, Bluetooth, NFC, Ethernet, USB, RS232, I²C, CANBUS, acoustic transmission or the like. For example, a communications module may be used to enable a receiver system according to the present invention to be connected to the CANBUS network on a car.

In another alternative embodiment, the transmission system comprises both one or more OWC transmitters for transmitting data 408 and a bus transmitter for transmitting data 408'. In this case, the communications module is both able to emit OWC signals and communicate on a bidirectional bus. The communications module is therefore operable as an OWC transceiver which is connectable to a network, for example an Ethernet or CANBUS network or the like.

FIGS. 5 to 8 give various examples of applications of the receivers of FIGS. 1 to 3 and/or the communications module of FIG. 4.

Figure 5:
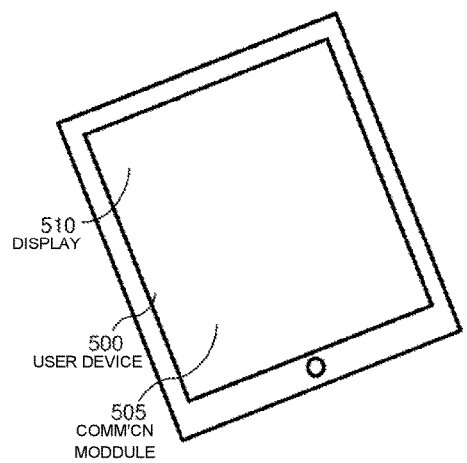
FIG. 5 is a schematic of a user device comprising the communications module of FIG. 4.

FIG. 5 shows a user device 500, such as a smartphone or tablet computing device, equipped with a communications module 505, such as that described above in relation to FIGS. 3 and/or 4. The user device 500 has a receiver system behind a display 510. The user device 500 is capable of receiving OWC signals using the receiver system, and is capable of transmitting OWC signals through the communications module 505. Therefore, the user device 500 is equipped to exchange data through OWC using the communications module 505. Advantageously, since the OWC receivers comprise solar cells, the user device can be at least partially powered by the light incident upon the at least one solar cell and/or save space and energy that would otherwise be consumed by the transimpedance amplifier.

Figure 6:
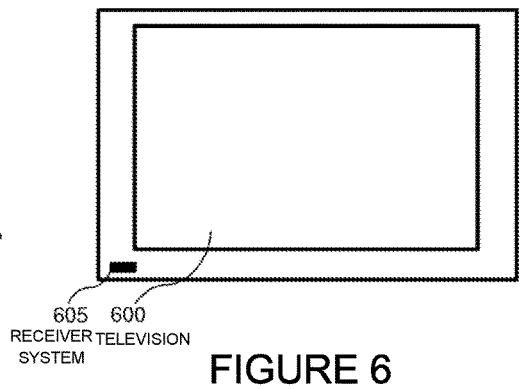
FIG. 6 is a schematic of a television comprising the receiver system of FIG. 1.

FIG. 6 illustrates a television 600, which is either powered externally or contains its own power source. It is common for devices such as these to continue to consume power when in standby mode, so that end users are faced with the choice of either wasting power by leaving the device in standby, or sacrificing convenience by turning the device off completely and not being able to return it to full operation by remote control.

In the embodiment of FIG. 6, the television 600 comprises a receiver system 605, such as the receiver system of FIG. 1 or the receiver system of FIG. 2. Since the receiver of the receiver system 605 comprises a solar cell or photovoltaic device, the receiver system 605 generates electrical power from the light incident upon it concurrently with detecting the OWC signal. This electrical power can then be used to power the receiver system 605. The receiver system is connected to a relay that is able to totally disconnect the main power source from the rest of the device. Therefore, the receiver system 605 is able to power the device on or off completely, such that it consumes no power in the off mode. However, since the receiver device 605 receives power from the light falling on the at least one solar cell or photovoltaic device, it can continue to operate without the device's power supply. Therefore, even though the device is consuming no power from its power source, it can still be placed in a standby mode, wherein a signal received by the receiver system 605 can be used to reconnect the power source and bring the device back to full operation.

Advantageously, the same receiver system 605 can be used to replace a conventional remote control receiver, so that no separate equipment is required for complete remote control of the device. Additionally or alternatively, the receiver system or communications module can be used to receive data to be shown on the device. For example, a mobile phone equipped with an OWC transmitter can be used to wake a television from a standby mode in which it consumes no power from its main power source, control the operation of the device, and transmit video and audio data to be shown by the television.

Figure 7:
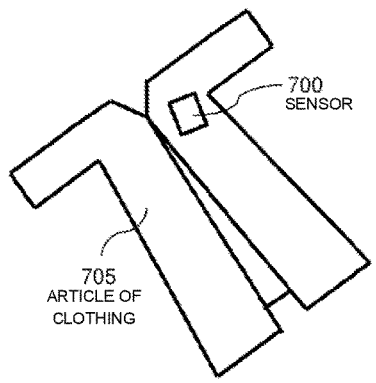
FIG. 7 is a schematic of an article of clothing comprising the communications system of FIG. 1.

FIG. 7 illustrates an embodiment of a device wherein the device is a sensor 700. In this case, the sensor 700 is incorporated into an article of clothing 705, but it is to be understood that the sensor 705 could just as easily be incorporated into a wearable device, an item of furniture or used as a standalone sensor. In this case the sensor 700 is an environmental sensor, for example, for monitoring temperature, light (for example visible light or UV) levels, pollution levels, inertial data, and/or the like. The sensor 700 comprises a communications module, such as the communications module of FIG. 4. Advantageously, since at least one receiver of the communications module comprised within the sensor 700 comprises a solar cell or photovoltaic device, the sensor 700 can be wholly or partially powered by the light falling upon it and advantageously communicate data from the sensor to an interrogating device or receive control data from a programming device using optical communications. However, since the receiver acts to both generate the electrical power required by the sensor and receive the optical communications signals, the number of components, and therefore the bulk, weight and/or complexity of the sensor 700 can be advantageously minimised.

For example, the article of clothing 705 can be put on by a person in their house. The sensor 700 can then be powered up by the light falling on it, and activated by an OWC system in the house sending an activation signal to it. The sensor 700 can also be instructed to log specific data, given sampling frequencies, or other control instructions. The person may then go about their daily business. Upon their return, the sensor 700 can be instructed via the at least one OWC receiver to activate its transmission system, and transmit its logged data to a home network for storage and processing. In this way the person can collect information about, for example, pollution levels, UV exposure, or just general fitness with a minimum of effort required.

Figure 8:
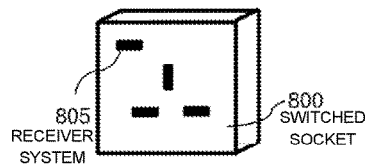
FIG. 8 is a schematic of a switched socket comprising the receiver of FIG. 1.

FIG. 8 shows an example of a switched socket 800 that includes a receiver system 805, such as those of FIG. 1 or FIG. 2 or a communications module such as that shown in FIG. 4. The receiver system 805 or communications module is configured to be able to switch the socket 800 on or off. Since the receiver system 805 comprises at least one solar cell or photovoltaic device as a receiver, the receiver system 805 or communications module can be powered by the light falling upon it, and no circuitry is required to convert the AC power present in the socket to a low voltage DC supply suitable for powering electronic circuitry. In this way the socket 800 can be remote controlled, in order to enable home automation or increase the convenience for a user. Optionally the communications module can be connected to a Power Line Communication (PLC) network.

Figure 9:
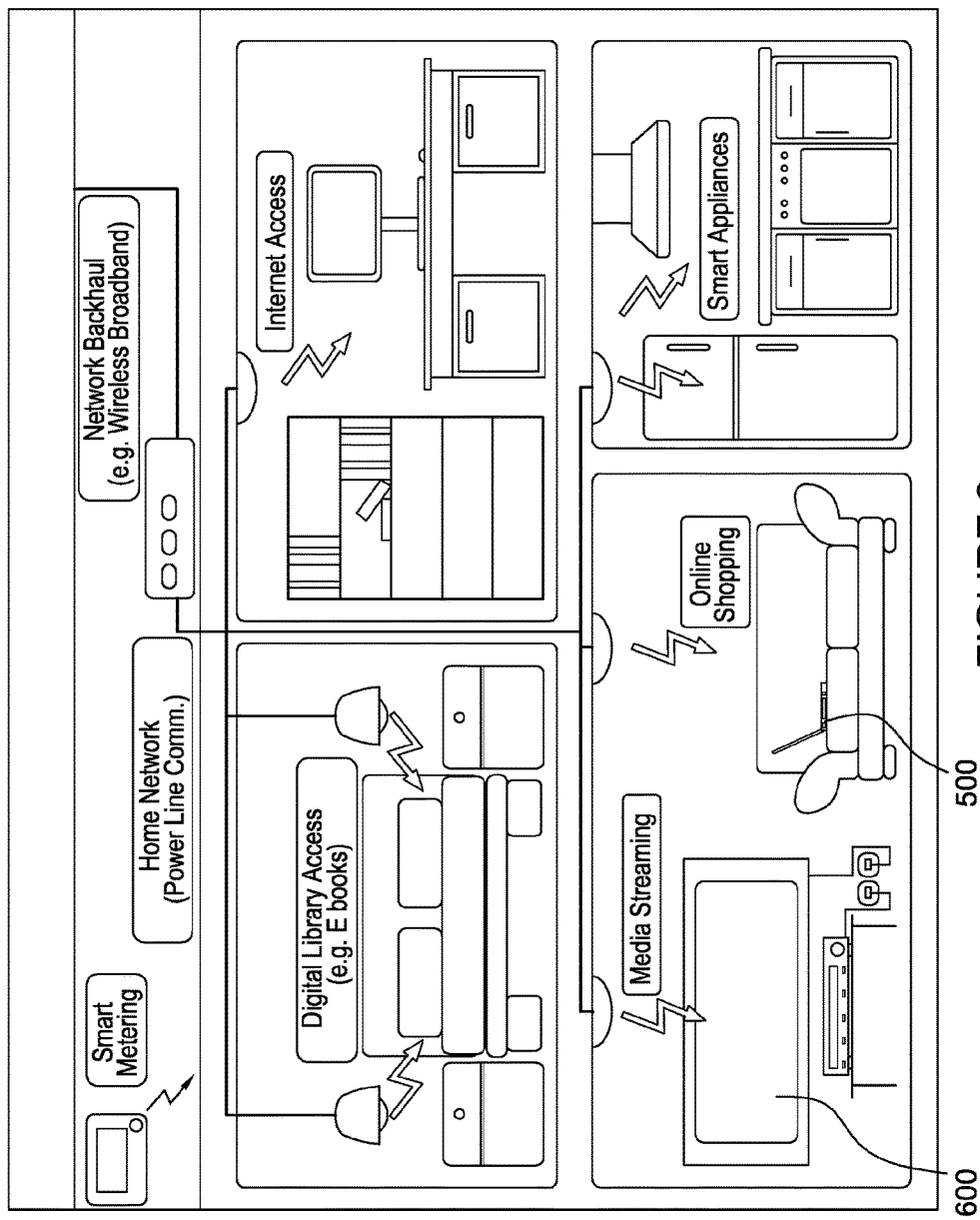
FIG. 9 is a schematic of a building utilising the receiver of FIG. 2 and the communications module of FIG. 4.

FIG. 9 shows a cross section of a home environment in which several optical wireless communications systems are employed, such as the user device 500 of FIG. 5 and the television 600 of FIG. 6. The various embodiments depicted here comprise communications systems, communications modules and receiver systems, such as those shown in FIGS. 1, 2 and 4 which allow the devices 500, 600 to communicate with each other and a house wide optical wireless communications system, provided using suitable light bulbs (such as LED bulbs) as transmitters.

Although various examples of applications of the receiver systems of FIGS. 1, 2 and 3 and the communications module of FIG. 4 are described above, it will be appreciated that the receiver systems and communications modules of the present invention are applicable to a wide range of potential applications and are not limited to the above specific examples.

For example, a building can comprise at least one receiving system, such as those of FIG. 1 or 2, which could be comprised in a communications module, such as that of FIG. 4. In this way, the at least one OWC receiver on the building advantageously comprises a solar cell or photovoltaic device. As such, the receiver provides electrical power to the house, as well as providing a communications link. In embodiments, the OWC receivers are substantially transparent, and are comprised in one or more windows of the house.

This arrangement can provide a large receiver area with which to receive internet connectivity from a directional OWC source on a remote base station. In this way no cable, optical fibres or the like are required across the so called 'difficult last mile' from the base station to the building.

In a slight variation of this example, a street light outside the building can comprise at least one OWC transmitter, and is configured to broadcast OWC signals which can be received by the at least one receiver on the building. In this way, relevant localised information may be transmitted from a public source and received only by the buildings in a particular neighbourhood. Such relevant information can include crucial safety information such as a storm warning, or can be more day-to-day information, for example to alert the residents of a building to the fact that the refuse collectors are approaching and they should take their bins out to be collected. In this case, the street light comprises a communications module, such as that shown in FIG. 4.

In another example, a garage door opener could be provided with an OWC receiver, such as that of FIG. 1 or FIG. 2, attached to the associated building. A car outside the building can transmit instructions to the garage door opener through a communications module, for example connected to its headlights. The car can also use this data connection to upload data from the trip computer to the house network.

The car itself can comprise one or more OWC receivers, and can receive broadcast data relevant to the neighbourhood, for example from the street lamp. For example, the street lamp can provide information on the local speed limit to the car, and this may be especially useful if a lower speed limit is in force during specific periods of the day.

These example embodiments illustrate only a small number of the ways in which the present invention could be used to enable point-to-point or broadcast Optical Wireless Communications.

Figure 10:
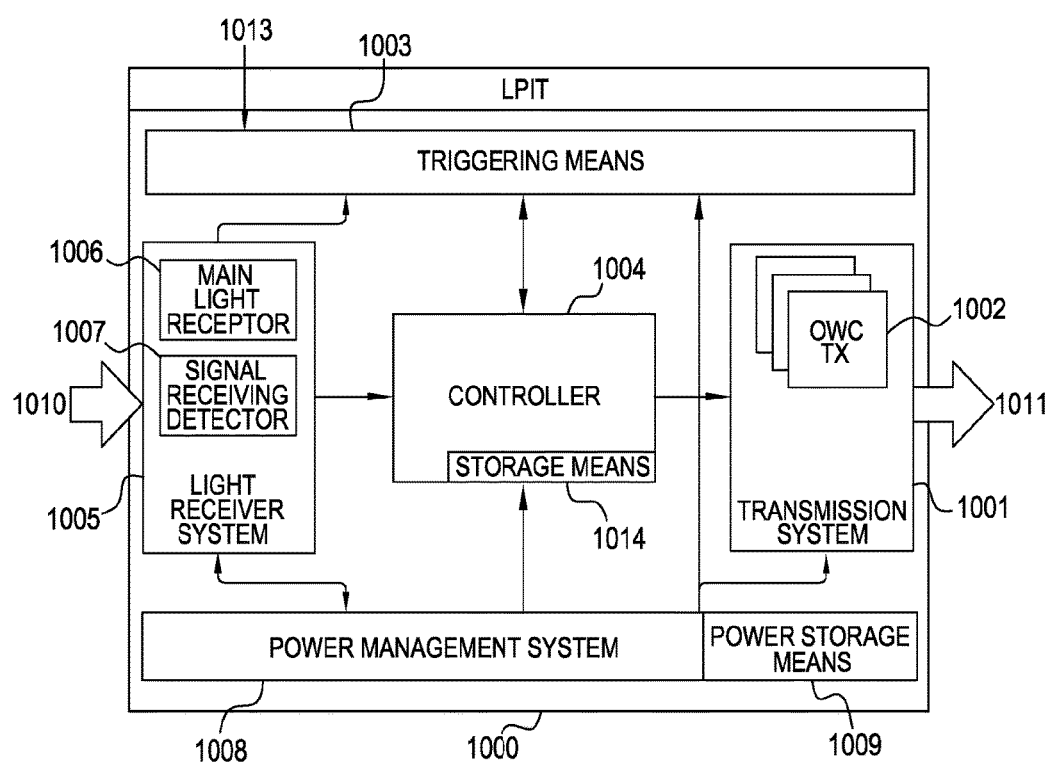
FIG. 10 is a schematic of a light powered wireless identification tag.

FIG. 10 shows a schematic view of a light powered identification tag (LPIT) 1000. The LPIT 1000 comprises a transmission system 1001, which in turn comprises a transmitter array 1002 having at least one OWC transmitter. In this way the LPIT 1000 can emit OWC signals 1011 using the transmitter array 1002. The LPIT 1000 also includes a triggering means 1003, controller 1004, and a light receiving system 1005. These are connected such that the triggering means 1003 can be activated by a signal (or lack thereof) from the light receiving system 1005, by a signal from the controller 1004, by an external input 1013 or any combination of these, e.g. as set by a user. Whilst the triggering means 1003 is depicted as separate from the controller 1004, in practice they can be substantially coextensive.

The light receiving system 1005 comprises at least one main light receptor 1006, which comprises a solar cell or photovoltaic device. This solar cell generates electrical energy from the light incident upon it 1010, and this energy is used to power, or partially power, the LPIT 1000. The light receiving system 1005 optionally also includes at least one signal receiving detector 1007, which receives OWC signals and sends them to the controller 1004. In this embodiment, the light receiving system 1005 also comprises signal conditioning apparatus that filters and amplifies the light signals before they are sent to the controller 1004. However, it will be appreciated that the at least one signal receiving detector 1007 is optional and in embodiments, the at least one main light receptor 1006 is operable to both generate electricity, for example to power or partially power the LPIT 1000, and also receive OWC signals and send them to the controller 1004, i.e. the main light receptor may be an integrated or dual function device.

The power management system 1008 receives electrical energy from the solar cell, and is connected to each component of the LPIT 1000 in order to provide the components with power. Advantageously, the power management system 1008 also comprises power storage 1009, such as a capacitor, supercapacitor or electrochemical cell. The power storage 1009 allows the LPIT 1000 to continue to operate despite intermittent supply from the solar cell, and provides a constant supply regardless of fluctuations in voltage from the solar cell.

The controller comprises storage means 1014, which in this embodiment comprises non-volatile memory such as EEPROM. This allows the LPIT 1000 to receive and store data in a non-volatile state, so that it is retained even if the LPIT 1000 is powered down.

The tag can be configured to operate in various modes. In a beacon mode, the tag 1000 will repeatedly transmit a code or codes whilst enough light falls on the main light receptor 1006. In an alternate embodiment, the tag is configured such that the triggering means is activated by covering of the main light receptor 1006, for example by a reader device. In a code trigger mode, the tag 1000 will only transmit a signal in response to receiving one of a predetermined set of codes. In a full transponder mode the LPIT 100 will relay any data it is sent.

It will be appreciated that variations to the above arrangement are possible, for example, in embodiments, the tag 1000 is provided with an additional signal receiving detector, such as a photo diode. This tag is configurable such that the signal receiving detector is used as the triggering means, for example in code trigger mode. Alternatively this tag can be configured such that, when the signal receiving detector is covered, the triggering means is activated. In this way a user can cover the signal receiving detector, in order to activate the LPIT.

In another exemplary embodiment, the triggering means comprises a different modality of input to OWC, such as a push button.

It is to be understood that the LPIT tags 1000 optionally make use of MIMO OWC, and can be capable of both receiving and sending MIMO OWC signals. In this case, the LPIT comprises a main light transmitter array, a main light receptor array, and is configured to use the main light receptor array as a signal receiving detector array. As before, the associated apparatus comprises the means for triggering, controlling, and signal conditioning.

In optional embodiments, the light receiving system can have a different field of view to that of the transmission system. For example, an example of such a LPIT comprises an OWC transmitter and a main light receptor that face different directions.

The controller is constructed using traditional metal-based circuitry, or may utilise organic or polymer electronics. The tag is fabricated onto a substrate by a method of fabrication that can comprise inkjetting or other methods normally employed for fabrication of plastic electronics. In optional embodiments, the tag is laid down in a single layer on the surface of a substrate, or alternatively can be advantageously built in multiple layers. In embodiments, the substrate or comprises a flexible substrate such as a polymer substrate, fabric substrate or paper.

The controller and/or memory comprise a pattern that modifies a property of the tag substrate or applied layer, for example physical indentations or raised elements in the substrate or variations in resistivity or refractive index.

It will be appreciated that such LPITs 1000 could have a number of potential uses. Some examples include (but are not limited to) labelling and identification of products, identification of transport vehicles by each other, or by signalling devices (e.g. cars by traffic lights or trains by stop signals). Another example of potential uses for the LPITs is in point of sale identification of goods for stock control and price scanning. Another example includes the attaching of identification tags to patients in hospitals, or to personnel in dangerous or hazardous environments, for example, to allow tracking. Other examples include identifying livestock or providing marketing information for products labelled with a LPIT. However, it will be appreciated that a wide range of possible exemplary uses for such tags would be evident to a skilled person in the art from the teachings of the present application.

While certain embodiments have been described, these embodiments have been presented by way of example only, and are not intended to limit the scope of the invention. Indeed the novel methods and systems described herein may be embodied in a variety of other forms. Furthermore, various omissions, substitutions and changes in the form of the methods and systems described herein may be made without departing from the spirit of the invention. The accompanying claims and their equivalents are intended to cover such forms and modifications as would fall within the scope of the invention.

For example, although various specific examples are given having a certain number of transmitters or receivers, it will be appreciated that other numbers or arrangements of transmitters and/or receivers may be used.

In addition, although the signals described herein are encoded by various exemplary techniques such as OOK, OFDM and spatial modulation, it will be appreciated that other suitable alternative techniques well known in the art may be used.

Furthermore, although the specific examples described preferentially and advantageously use visible light communications, it will be appreciated that some embodiments may use other frequencies of optical signal, such as IR or UV.

The invention claimed is:

1. A receiver system, the receiver system comprising:
   at least one receiver array, the at least one receiver array comprising a plurality of receivers for receiving optical communications signals that encode or transmit information,
   wherein:
   the plurality of receivers are or comprise at least one of: solar cells or photovoltaic cells; and
   the receiver system is adapted to produce one or more electrical signals from at least one of: the received optical signal or ambient light, such that the receiver system is usable as a source of electrical power and the encoded or transmitted information from the received optical communication signal is recovered or recoverable from the one or more electrical signals.

2. The receiver system according to claim 1, wherein the receiver system is configured to receive signals encoded by Orthogonal Frequency Division Multiplexing, spatial modulation or on-off keying.

3. The receiver system according to claim 2, wherein the processing apparatus is partially or wholly powered by the energy produced by at least one of the plurality of receivers.

4. The receiver system according to claim 1, wherein the received optical signal comprises a DC component and wherein the receiver system comprises processing apparatus that receives the one or more electrical signals, the one or more electrical signals being dependent on the received optical communications signal, and process the signal to recover the transmitted information.

5. The receiver system according to claim 4, wherein the received signals comprise the DC component which is used or usable to power or partially power the receiver system.

6. The receiver system according to claim 1, comprising a screen or display, wherein the screen or display and at least one of the plurality of receivers is arranged such that a portion of the light passing through the screen/display or receiver(s) is utilised by the other of the screen/display or receiver(s).

7. The receiver system according to claim 6, wherein the screen or display is or comprises a transparent or semi-transparent screen or display.

8. The receiver system according to claim 7, wherein the screen or display is substantially transparent or semi-transparent only to one or more parts or portions of the light spectrum, and at least one of the plurality of receivers is receptive to at least one of the one or more parts or portions of the light spectrum.

9. The receiver system according to claim 8, wherein at least one of the plurality of receivers is configured to receive optical communications signals that have passed through the screen or display.

10. The receiver system according to claim 6, wherein at least one of the plurality of receivers is substantially transparent or semi-transparent to one or more parts or portions of the light spectrum, and the screen or display utilises at least one of the one or more parts or portions of the light spectrum.

11. The receiver system according to claim 10, wherein at least one of the plurality of receivers is mounted in front of the screen, and the screen is visible through the at least one receiver.

12. The receiver system according to claim 10, wherein at least one of the plurality of receivers is mounted behind the screen, and at least a portion of the light or spectrum passing through the display is incident on the at least one receiver.

13. The receiver system according to claim 1, wherein the receiver system is partially or wholly powered by the energy produced by at least one of the plurality of receivers.

14. The receiver system according to claim 13, wherein the receiver system is configured to act as a power supply for an attached load or apparatus.

15. The receiver system according to claim 1, wherein the optical communications signals are Visible Light Communications signals.

16. The receiver system according to claim 1, wherein at least one of the plurality of receivers is a passive receiver, which is completely powered by the light incident on it.

17. The receiver system according to claim 1, wherein at least one of the plurality of receivers directly produces a voltage from the received signal and/or ambient light.

18. The receiver system according to claim 1, wherein at least one of the plurality of receivers is substantially transparent or semi-transparent for one or more parts or portions of the light spectrum.

19. The receiver system according to claim 18, wherein the receiver system is configured to be mountable to a window.

20. The receiver system according to claim 1, wherein at least one of the plurality of receivers comprises a flexible substrate.

21. The receiver system according to claim 1, wherein the receiver system comprises at least one electronic filter.

22. The receiver system according to claim 1, wherein the receiver system is connected to a load or apparatus and is configured to partially or wholly power the load or apparatus.

23. The receiver system according to claim 1, wherein the receiver system is configured such that the signals are only received on one or more parts or portions of an active surface of by at least one of the plurality of receivers, which are less than the total active surface of the at least one receiver.

24. The receiver system according to claim 1, wherein the receiver system comprises focusing or other optical steering means for focusing or directing the one or more optical communications signals onto by at least one of the plurality of receivers or onto the parts or portions of by at least one of the plurality of receivers.

25. The receiver system according to claim 24, wherein the focusing or other optical steering means is operable to adjust the effective capacitance of the receiver system, in order to adjust at least one of: the responsiveness or bandwidth of the at least one receiver.

26. The receiver system according to claim 24, wherein the focusing or other optical steering means is adjustable in real-time during use.

27. The receiver system according to claim 1, wherein at least one receiver array is configured to receive signals modulated by spatial modulation.

28. A communications module comprising a receiver system according to claim 1 and at least one transmission system, wherein the transmission system comprises at least one transmitter.

29. The communications module according to claim 28, wherein the communications module comprises at least one transmitter array, and at least one transmitter is comprised in the transmitter array(s).

30. The communications module according to claim 28, wherein at least one transmitter is an optical communications transmitter.

31. The communications module according to claim 30, wherein at least one optical communications transmitter is configured to utilise a different part of the electromagnetic spectrum to that of at least one of the receivers.

32. The communications module according to claim 29, the communications module comprising processing apparatus for controlling the transmitter to encode information in the light signal by modulating the visible light signal, wherein the light signal comprises at least a dc component.

33. The communications module according to claim 28, wherein the transmitter comprises a laser.

34. The communications module according to claim 30, wherein at least one transmission system utilises a separate modality of communications, so that the communications module can convert received optical communications into another form of communication signal.

35. The communications module according to claim 28 wherein at least one of: the communications module or communications processing apparatus is partially or wholly powered by the energy produced by at least one of the receivers.

36. The communications module according to claim 35, wherein the communications module is configured to act as a power supply for an attached device, load or apparatus.

37. A device comprising a receiver system according to claim 1, wherein the device is a smartphone, laptop, tablet computer, television, sensor apparatus, actuator, transducer, relay or wireless identification tag.

38. The device according to claim 37, wherein the device is comprised in or configured to be mounted to an item of clothing or furniture, or wherein the device is or is comprised in a wearable device.

39. The device according to claim 37, wherein the device is partially or wholly powered by the energy produced by at least one of the receivers.

40. The device according to claim 37, wherein the device is configured to act as a power supply for a load or apparatus.

41. A vehicle or building which comprises a receiver system according to claim 1.

42. A method of receiving an optical communications signal using the receiver system according to claim 1, the method comprising receiving an optical signal using the receiver system, determining transmitted information from the received optical signal and generating electrical power from the optical signal using at least one of the receivers.

43. A device comprising:
  a screen or display; and
  at least one optical communications receiver array, the at least one receiver array comprising a plurality of receivers for receiving optical communications signals that encode or transmit information,
  wherein:
    the receivers are or comprise at least one of: solar cells or photovoltaic cells,
    the receiver system is adapted to produce one or more electrical signals from at least one of: the received optical signal or ambient light, such that the receiver system is usable as a source of electrical power and the encoded or transmitted information from the received optical communication signal is recovered or recoverable from the one or more electrical signals, and
    the screen or display and optical communications receiver are arranged such that a portion of the light passing through the screen/display or receiver(s) is utilised by the other of the screen/display or receiver(s).

44. The device according to claim 43, wherein the screen or display is or comprises a transparent or semi-transparent screen or display.

45. The device according to claim 44, wherein the screen or display is substantially transparent or semi-transparent only to one or more parts or portions of the light spectrum, and at least one of the plurality of receivers is receptive to at least one of the one or more parts or portions of the light spectrum.

46. The device according to claim 44, wherein at least one of the plurality of receivers is configured to receive optical communications signals that have passed through the screen or display.

47. The device according to claim 43, wherein at least one of the plurality of receivers is substantially transparent or semi-transparent to one or more parts or portions of the light spectrum, and the screen or display utilises at least one of the one or more parts or portions of the light spectrum.

48. The device according to claim 47, wherein at least one of the plurality of receivers is mounted in front of the screen, and the screen is visible through at least one receiver or receiver array.

49. The device according to claim 43, wherein the device is partially or wholly powered by the energy produced by at least one of the receivers.

50. The device according to claim 43, wherein the device is configured to act as a power supply for an attached load or apparatus.

* * * * *

UNITED STATES PATENT AND TRADEMARK OFFICE
CERTIFICATE OF CORRECTION

PATENT NO. : 10,135,528 B2  
APPLICATION NO. : 15/101341  
DATED : November 20, 2018  
INVENTOR(S) : Dobroslav et al.

Page 1 of 1

It is certified that error appears in the above-identified patent and that said Letters Patent is hereby corrected as shown below:

On the Title Page

(30) Foreign Application Priority Data:  
Delete "Dec. 2, 2014" and insert --Dec. 2, 2013--

Signed and Sealed this  
Eighth Day of January, 2019

Andrei Iancu  
*Director of the United States Patent and Trademark Office*